Feb. 17, 1970  G. H. VANDERBORGH, JR., ET AL  3,495,573
METHOD OF GROWING OYSTERS
Filed April 12, 1968

3,495,573
METHOD OF GROWING OYSTERS
George H. Vanderborgh, Jr., Sayville, and Phillip J. Campbell, Huntington Station, N.Y., assignors to Long Island Oyster Farms, Inc., New York, N.Y., a corporation of New York
Filed Apr. 12, 1968, Ser. No. 720,999
Int. Cl. A01k 61/00
U.S. Cl. 119—4         7 Claims

ABSTRACT OF THE DISCLOSURE

The mass production of bivalve mollusks; more particularly the growing of seed mollusks, especially seed oysters under controlled hatchery conditions.

---

The growing of seed mollusks on a commercial or mass production scale has not changed significantly since 1920 to 1925, when methods and procedures for the mass artificial propagation of mollusks were first described by W. F. Wells in his annual report to the New York State Conservation Department. The more recent techniques or advances are described by V. L. Loosanoff and H. C. Davis, in "Advances in Marine Biology," vol. 1, p. 1–136 (1963).

In the growing of seed oysters in hatcheries, the oyster larvae are allowed to set on cultch material, usually oyster shells, under controlled conditions of temperature and freedom from harmful pests and contaminants. The young oysters are then allowed to grow under the most favorable conditions for two to six weeks, or until they are ¼" to ½" in diameter. The seed oysters are then transferred to natural oyster grounds, especially in Long Island Sound and other New England locations. The number of oyster seeds on each oyster shell will vary considerably depending upon how heavy the set is, but in many instances there will be crowding, so that the growth of the oysters will be hampered. Such overcrowding thus may result in a high mortality of oysters and in production of large numbers of undersized, or runt, oysters, that have little commercial value until they are separated and returned to the oyster bed for further growing. Also, at harvest time, the removal of the oysters from the oyster shell cultch results in damage to a large number of oysters and this reduces the yield of commercially usable oysters and, therefore, an increased cost for the production of the oysters.

In view of the above there has been a great need for a more practical method for the mass production of seed mollusks, especially oyster seed. It is therefore a major object of this invention to provide an efficient method for the mass production of seed mollusks by a single seed technique, especially single seed oysters. Other objects of the invention will be apparent from the description of the invention which follows.

The attainment of the objects of our invention is made possible by our discovery that oyster larvae will set on certain artificial cultch materials and, if the larvae are periodically removed from the cultch during the metamorphosis of the larvae to young oysters, or shortly thereafter, the young oysters can be removed before they become permanently attached to the cultch material. Thus, our single oyster technique results in the production of individual young oysters that are unattached to a cultch material. The oyster seed produced by our single oyster technique can be graded as to size, as will be hereinafter explained, so that there will be more uniformity in size of the seeds when they are ready for transfer to the ocean growing areas.

A particularly desirable cultch for use in our invention is a flexible screen; for *C. virginica* it should be no larger mesh than 80 mesh U.S. Standard. Advantageously, the screen is placed in the setting tank so that substantially all of the larvae will fall or set on it during the setting period, usually three to seven days, depending upon the ecological and environmental conditions. The screen is of fine enough mesh to retain the larvae.

Periodically, during this period that the attached larvae are completing their metamorphosis, the larvae are physically loosened or removed from the screen cultch by, for example, a water spray or squeegee or a combination of water spray and squeegee. As the young oysters grow they may be transferred to progressively larger mesh screens. This provides for grading of the oysters as to size with the smaller or runt oysters being filtered through the screen and rejected. The use of screens for growing the single oysters also has the advantage of providing a means for waste material removal. Also, the screens permit more efficient circulation of the aqueous nutrient media.

Although screens made of various materials can be used, we prefer a screen made of monofilament synthetic polymer fibers such as nylon. Nylon screens are readily available in all standard mesh sizes and, when used as the cultch material, permit the larvae to be removed therefrom with a minimum of damage to the larvae.

The invention may be more readily understood by referring to the drawings wherein.

Figure 1:
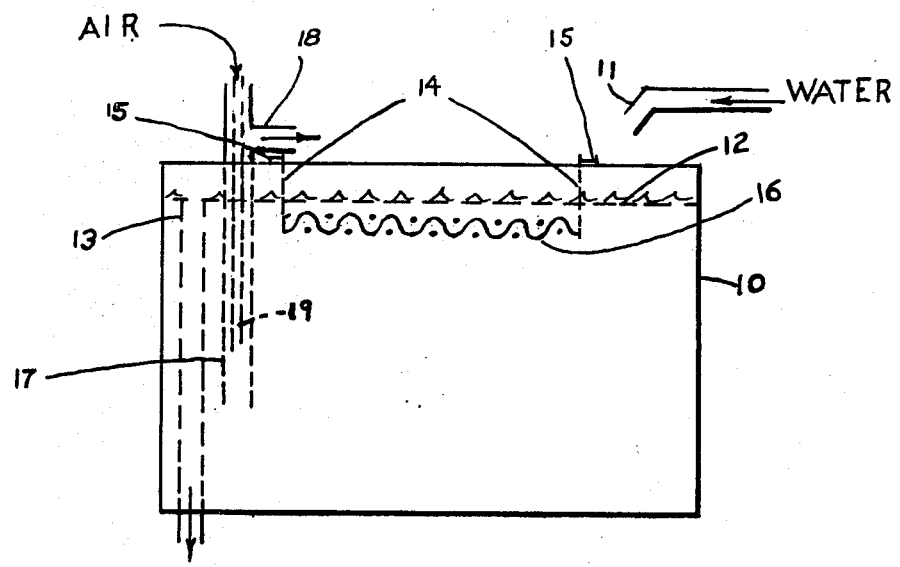
FIG. 1 represents a tank and suitable arrangement of equipment for growing oyster seed in accordance with the invention.

In FIGURE 1, 10 represents a suitable tank, e.g. a 5' x 10' x 2' fiberglass tank, that is continuously supplied with centrifuged sea water at 11. The water is supplemented with food of desirable quality for oyster propagation and maintained at a lever 12 by an overflow outlet 13 about two inches below the top of the tank. A rack 14 is set into the tank and may be floated on the surface or it may be supported in position by hangers 15. The bottom of rack 14 is covered with 80 mesh nylon monofilament screen 16. The top of rack 14 extends above the water level 12. Water from the tank is continuously circulated through the rack by a pump which may consist of a tube 17 which is open at both ends and has an outlet 18. Air is forced into tube from air line 19 which extends down into the larger tube 17. Air is forced into the tube at such a rate that water is forced to flow out of outlet 18 into the tray. If desired, water containing the desired nutrients can be pumped directly into the setting rack.

Figure 2:
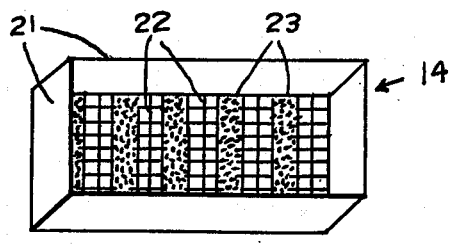
FIG. 2 represents a particular type of setting rack that is useful in the practice of the invention.

In FIGURE 2, 21 represents the sides and ends of a suitable rack as represented at 14 in FIGURE 1. The sides and ends may, for example, be 1" x 4" wood boards fastened by any suitable means at the corners. The bottom 22 is completely covered with 80 mesh screen and stripes 23 of calcium hydroxide, or other material that attracts the larvae, are coated thereon. A suitable method of applying the stripes of calcium hydroxide is to form a 50% by weight aqueous slurry of powdered calcium hydroxide and then brush stripes of the slurry onto the surface of the screen that forms the inside surface of the bottom of the rack.

In practicing the invention, a desired quantity of larvae that are ready to begin setting is placed in rack 14 and centrifuged sea water containing proper nutrients is circulated therethrough. After the desired amount of setting has occurred, preferably after 12 to 48 hours, and preferably before all the larvae have set, the rack is removed from the tank and the unset larvae are removed and separated from the set larvae. The unset larvae may be separated by washing the screen and rack with a low pressure stream of sea water without loosening the set larvae. Afterward the set larvae are removed from the screen with a high pressure stream of sea water or by squeegee and washing. The unset larvae are returned to setting rack 14 and setting is allowed to continue for another period of 12 to 48 hours and the step of separating set from unset larvae is repeated. The set larvae which are separated from the 80 mesh screen are transferred to a rack having a lower mesh screen, e.g. a 50 or 60 mesh screen, and placed in a growing tank for growing the young oysters. The 50 or 60 mesh screen can be used to separate the small or runt oysters and these can be allowed to grow to a larger size on a 80 mesh screen. As the oysters continue to grow they are transferred to larger screens until they are the desired size for sale as seed oysters. The growing of the young oysters on screens of increasingly coarser mesh permits the grading of the oysters as to size so that individual seed oysters of more uniform size can be marketed. Use of the screens allows for more efficient use of the nutrient media and also allows for wastes to be readily removed.

The media used for growing the young oysters after separation from the cultch may be the same as used for setting of the larvae. Advantageously the growing racks can be placed in the same tank with the setting rack if the tank is large enough.

Although we have described the use of only a limited number of specific artificial cultches that can be used, it is to be understood that the invention is not to be limited to these specific cultches. For instance we can use a sheet of plastic, such as polyvinyl chloride or polyethylene to cover the nylon screen and allow the larvae to set on the smooth surface of the plastic. This permits the set larvae to be readily removed from the smooth plastic and separation of unset larvae from set larvae merely by removing the plastic sheet from the rack and placing another plastic sheet in the rack for further setting. The set larvae can be removed from the plastic sheet in the same manner as they are removed from the screen or coated screen. If desired the plastic sheet may be coated with calcium hydroxide or calcium carbonate, or other suitable material to attract the larvae.

It is well known that the metamorphosis is a very critical period during the life cycle of mollusks. The young mollusks are subject to such hazards as physical harm and predators; also, due to its rearrangement of organal structure, the animal is vulnerable during metamorphosis to massive infectation by various detrimental pathogens. It is therefore surprising that the single oyster technique of the present invention provides seed mollusks and also results in a reduction of the high mortality that usually accompanies metamorphosis.

While there have been described what is at present considered to be the preferred embodiments of this invention, it will be obvious to those skilled in the art that various changes and modifications may be made therein without departing from the invention.

We claim:
1. The method of producing single seed mollusks which comprises,
   (1) setting of the mollusk larvae, under larvae setting conditions, onto an artificial cultch,
   (2) successively physically removing the set larvae from the clutch at periods of time ranging from 12 to 48 hours throughout the metamorphosis of the larvae to young mollusk, and
   (3) growing the young mollusk to the desired seed size under controlled environment.
2. The method of producing single seed mollusks which comprises,
   (1) setting of the mollusk larvae, under larvae setting conditions, onto an artificial cultch consisting of a screen of mesh fine enough to filter out the larvae,
   (2) physically removing the set larvae from the screen at periods of time ranging from 12 to 48 hours throughout the metamorphosis of the larvae to young mollusk, and
   (3) growing the young mollusk to the desired seed size under controlled environment.
3. The method of producing single seed mollusks which comprises,
   (1) setting of the larvae onto a smooth sheet of plastic which is coated with calcium hydroxide,
   (2) physically removing the set larvae from the cultch at periods of time ranging from 12 to 48 hours throughout the metamorphosis of the larvae to young mollusks and
   (3) growing the young mollusk to the desired seed size under controlled environment.
4. The method of producing single seed mollusks as in claim 2, wherein step (3) includes growing the young mollusks on a screen of mesh size fine enough to retain the young mollusks and with the nutrient flowing said screen.
5. The method of producing single seed mollusks as in claim 4, wherein step (3) includes the use of progressively larger screens that retain the young mollusks of desired size but allows the wastes, contaminants and runt mollusks to filter through.
6. The method of growing single seed oysters which comprises:
   (1) setting of the *Crassostrea virginica* larvae, under larvae setting conditions, onto an artificial cultch,
   (2) successively physically removing the set larvae from the cultch at periods of time ranging from 12 to 48 hours throughout the metamorphosis of the larvae to young oysters and
   (3) growing the young oysters to the desired seed size under controlled environment.
7. The method of growing single seed oysters as in claim 6 wherein the artificial cultch is a nylon screen of fine enough mesh to filter out the larvae and the said screen is partially coated with calcium hydroxide.

References Cited

UNITED STATES PATENTS

| | | | |
|---|---|---|---|
| 1,933,950 | 11/1933 | Wells | 119—4 |
| 3,017,857 | 1/1962 | Munz | 119—4 |

OTHER REFERENCES

A New Chapter in Shellfish Culture, pp. 7, 9, 11, 13 and 15–18, by Wm. Firth Wells, 15th Annual Report (1925) of Conservation Commission State of New York.

Commercial Fisheries Review, September 1958, Oysters—Use of Plastics for Collecting Oyster Set, pp. 53–54, by Victor L. Loosanoff.

ALDRICH F. MEDBERY, Primary Examiner